US010106638B2

(12) United States Patent
Burdeniuc et al.

(10) Patent No.: US 10,106,638 B2
(45) Date of Patent: Oct. 23, 2018

(54) REDUCED EMISSIONS LOW DENSITY SPRAY POLYURETHANE FOAM

(75) Inventors: Juan Jesus Burdeniuc, Colmar, PA (US); James Douglas Tobias, Center Valley, PA (US); Renee Jo Keller, Orwigsburg, PA (US)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/556,334

(22) Filed: Jul. 24, 2012

(65) Prior Publication Data

US 2013/0190415 A1 Jul. 25, 2013

Related U.S. Application Data

(60) Provisional application No. 61/513,209, filed on Jul. 29, 2011.

(51) Int. Cl.
C08G 18/18 (2006.01)
C08G 18/48 (2006.01)
C08G 18/76 (2006.01)
C08G 101/00 (2006.01)

(52) U.S. Cl.
CPC ..... *C08G 18/1858* (2013.01); *C08G 18/1825* (2013.01); *C08G 18/48* (2013.01); *C08G 18/7671* (2013.01); *C08G 18/18* (2013.01); *C08G 18/1808* (2013.01); *C08G 18/1833* (2013.01); *C08G 2101/005* (2013.01); *C08G 2101/0025* (2013.01); *C08G 2101/0083* (2013.01)

(58) Field of Classification Search
CPC ............ C08G 18/18; C08G 18/1808; C08G 18/1825; C08G 18/1833; C08G 18/1858
See application file for complete search history.

(56) References Cited

U.S. PATENT DOCUMENTS

| 3,202,631 A | | 8/1965 | Fauser | |
|---|---|---|---|---|
| 3,238,154 A | | 3/1966 | Mosso | |
| 3,419,455 A | | 12/1968 | Roberts | |
| 3,645,924 A | | 2/1972 | Fogiel | |
| 3,720,632 A | | 3/1973 | Phillips et al. | |
| 3,740,377 A | | 6/1973 | Huffman et al. | |
| 3,767,602 A | | 10/1973 | Carroll et al. | |
| 3,772,221 A | | 11/1973 | Hostettler et al. | |
| 3,793,237 A | | 2/1974 | Watkinson | |
| 3,903,018 A | | 9/1975 | Kolakowski et al. | |
| 3,920,587 A | | 11/1975 | Watkinson | |
| 3,943,075 A | * | 3/1976 | Fishbein et al. | 521/174 |
| 3,993,606 A | * | 11/1976 | Von Bonin et al. | 521/111 |
| 4,024,090 A | * | 5/1977 | Von Bonin et al. | 521/110 |
| 4,025,466 A | | 5/1977 | Jourquin et al. | |
| 4,087,389 A | * | 5/1978 | Coppola | 521/159 |
| 4,150,206 A | * | 4/1979 | Jourquin et al. | 521/51 |
| 4,254,228 A | * | 3/1981 | Kleimann et al. | 521/128 |
| 4,360,603 A | * | 11/1982 | Grogler et al. | 521/159 |
| 4,377,644 A | * | 3/1983 | Kopp et al. | 521/94 |
| 4,596,665 A | | 6/1986 | Gonzalez et al. | |
| 4,794,127 A | | 12/1988 | Knobel et al. | |
| 4,910,230 A | * | 3/1990 | Tamano et al. | 521/110 |
| 5,114,985 A | | 5/1992 | Kuyzin et al. | |
| 5,244,931 A | | 9/1993 | Kuyzin | |
| 5,304,578 A | | 4/1994 | Tamano et al. | |
| 5,508,314 A | * | 4/1996 | Listemann et al. | 521/115 |
| 5,614,566 A | | 3/1997 | Burkhart et al. | |
| 5,756,557 A | | 5/1998 | Kimock et al. | |
| 5,852,065 A | | 12/1998 | Frey et al. | |
| 5,874,483 A | * | 2/1999 | Savoca et al. | 521/115 |
| 6,043,290 A | | 3/2000 | Petrella | |
| 6,046,249 A | | 4/2000 | Tobias et al. | |
| 6,051,527 A | * | 4/2000 | Savoca et al. | 502/167 |
| 6,387,972 B1 | * | 5/2002 | Ghobary et al. | 521/115 |
| 6,586,490 B1 | * | 7/2003 | Dietrich et al. | 521/167 |
| 6,835,757 B2 | * | 12/2004 | Burdeniuc | 521/130 |
| 6,858,654 B1 | * | 2/2005 | Wendel | C08G 18/1825 521/128 |
| 2007/0225393 A1 | * | 9/2007 | Arnold et al. | 521/161 |
| 2010/0099785 A1 | | 4/2010 | Rister, Jr. et al. | |
| 2010/0152312 A1 | * | 6/2010 | Burdeniuc et al. | 521/118 |
| 2011/0184080 A1 | | 7/2011 | Schoenberger et al. | |
| 2011/0196055 A1 | * | 8/2011 | Kramer et al. | 521/93 |

FOREIGN PATENT DOCUMENTS

| GB | 966338 | 8/1964 |
|---|---|---|
| GB | 990 637 A | 4/1965 |
| GB | 996 523 A | 6/1965 |

(Continued)

OTHER PUBLICATIONS

Listemann, M.L., et al.; "The Influence3 of Tertiary Amine Structure on Blow-to Gel Selectivity"; 1993; pp. 594-608.
Dimitrios V. Dounis, et al., Influence of Diethanolamine on Hard Segment Ordering in Flexible Polyurethane Foam, Department of Chemical Engineering, Nov. 19, 1996, pp. 525-537.
Carolina Molero, et al., Recovery of Polyols from Flexible Polyurethane Foam by "split-phase" Glycolysis with New Catalysts, Department of Chemical Engineering, Jun. 22, 2005, pp. 894-901.
Ron Herrington, et al., Flexible Polyurethane Foams, Dow Polyurethanes Flexible Foams, Jul. 1997, pp. 2.28-2.32, 9.24 and 14.10.

(Continued)

*Primary Examiner* — Melissa A Rioja
(74) *Attorney, Agent, or Firm* — Andrew H. Chung; Linda S. Li; Jason S. Ngui

(57) ABSTRACT

This disclosure is directed to make low density and low amine emissions water blown polyurethane foams using a reactive catalyst composition. The method is particularly useful in the preparation of full water blown, low density polyurethane foams having a density in the range of about 6 to about 16 kg/m3. A catalyst composition comprising at least one non-emissive amine catalyst and tetraalkyl guanidine, the method of employing the catalyst composition and a formulation comprising the catalyst composition are disclosed.

21 Claims, No Drawings

(56) References Cited

FOREIGN PATENT DOCUMENTS

| | | |
|---|---|---|
| GB | 1 063 508 A | 3/1967 |
| GB | 1063508 | 3/1967 |
| GB | 1 064 555 A | 4/1967 |
| GB | 1064555 | 4/1967 |
| GB | 1 104 839 A | 2/1968 |
| GB | 1 308 637 A | 2/1973 |
| GB | 1 339 441 A | 12/1973 |
| GB | 1 365 215 A | 8/1974 |
| GB | 1 471 102 A | 4/1977 |
| GB | 1 571 730 A | 7/1980 |
| RU | 2226538 C2 | 4/2004 |
| SU | 615865 A3 | 7/1978 |
| SU | 786862 | 12/1980 |
| WO | 01/58976 A1 | 8/2001 |
| WO | 03/016372 A1 | 2/2003 |
| WO | 03/016373 A1 | 2/2003 |
| WO | 03/055930 A1 | 7/2003 |
| WO | 2004/060956 A1 | 7/2004 |
| WO | 2006/116456 A1 | 11/2006 |

OTHER PUBLICATIONS

M. L. Listemann, et al., The Influence of Tertiary Amine Structure on Blow-to-Gel Selectivity, Polyurethanes World of Congress 1993, pp. 595-608.

\* cited by examiner

REDUCED EMISSIONS LOW DENSITY SPRAY POLYURETHANE FOAM

CROSS-REFERENCE TO RELATED APPLICATIONS

This application claims the benefit of U.S. Patent Application No. 61/513,209, filed on Jul. 29, 2011. The disclosure of Application No. 61/513,209 is hereby incorporated by reference.

BACKGROUND OF THE INVENTION

This disclosure relates to the production of low density polyurethane foam with low or no amine emissions, particularly full water blown spray polyurethane foams.

The primary use of spray foam is in commercial and residential areas where spraying polyurethane foam brings advantages such as heat and sound insulation as well as mechanical integrity for the structures and surfaces in contact with spray foam material. Typically polyurethane foam is made by reacting isocyanate or polyisocyanate with a polyhydroxyl compound in the presence of certain additives such as surfactants, catalysts, crosslinkers and blowing agents.

Blowing agents are typically low boiling point liquids that can vaporize when heat is generated during the reaction of isocyanates with polyols and crosslinkers. Thus, density can be controlled to some extend by the amount of blowing agent present in the polyurethane formulation. In the past, chlorofluorocarbons (CFCs) were used as effective blowing agents but in recent years their use has been banned due to environmental concerns related to stratospheric ozone depletion. Replacing CFCs with other blowing agents is an ongoing challenge. After the phase out of CFCs other blowing agents were developed including hydrochlorofluorocarbons (HCFCs) as an interim solution. HCFCs are substances that still contain chlorine however their ozone depletion potential (ODP) is lower than those of CFCs due to their shorter life in the environment. Some other alternatives are now currently available or under development. For example CFCs can be conveniently replaced by hydrofluorocarbons (HFCs) which have lower ODP than CFCs. Another alternatives include HFO (hydrofluoroolefins), FO (fluoroolefins), CFO (chlorofluoroolefins) and HCFO (hydrochlorofluoroolefins) all of which are characterized in having low life in the environment resulting in low ODP as well as low GWP. Examples include trans-1,3,3,3-tetrafluoroprop-1-ene or HFO-1234ze; tran-1-chloro-3,3,3-trifluoropropene or HCFO-1233zd; 2,3,3,3-tetrafluoropropene or HFO-1234yf, mixtures thereof and similar structures. However, these blowing agents are relatively expensive when compared with other available materials such as acetone or carbon dioxide. The most convenient route for blowing polyurethane polymers is by in-situ generation of carbon dioxide when isocyanates react with water.

However, obtaining low density polyurethane foam using water as the main or sole blowing agent requires isocyanate to react with a substantial amount of water and this process needs to be catalyzed by suitable amine catalysts. Amines such as bis-(dimethylaminoethyl)ether (BDMAEE) or pentamethyl-diethylenetriamine (PMDETA) are the standard catalysts used to make low densities foam (0.5 lb/cubic feet) with water as the blowing agent.

BDMAEE and PMDETA are characterized by their high vapor pressure and strong amine odor. Thus, amine exposure can occur during system preparation (blending of formulation components), spraying (application) and final use (occupancy).

BDMAEE is generally considered the most efficient catalyst available to activate water towards isocyanate and it is expected that any combination of catalysts containing isocyanate reactive groups would be less effective than BDMAEE. The reason for the superior performance of BDMAEE has been attributed to the N—C2-O—C2-N molecular backbone which has the ideal geometry for water activation. The reactivity of conventional catalysts is discussed in "The Influence of Tertiary Amine Structure on Blow-To-Gel Selectivity" by M. L. Listeman et al., Polyurethanes World Congress, 1993.

GB 0966338 relates to polyurethane lacquers and surface coatings and the use of aliphatic isocyanate derivates, certain metallic compounds or amines in preparing such polyurethane lacquers and surface coatings. GB 1063508 discloses the preparation of rigid foamed polyurethane in situ on a surface. GB 1064555 relates to the preparation of rigid polyurethane foams having improved physical properties. U.S. Pat. No. 3,202,631 discloses a process for stabilizing polyurethane elastomers within a Mooney plasticity range suitable for processing on a mill. More particularly, it discloses a method for preventing the un-controlled post curing of a polyurethane elastomer. U.S. Pat. No. 3,645,924 describes processes for preparing aliphatic-isocyanate based open-cell flexible foam and polyurethane moisture-cure coatings. U.S. Pat. No. 3,740,377 concerns a one-step process for preparing polyurethane-urea resins and elastomers. US 2010/0099785 provides methods and compositions for forming a catalyst. In one aspect, the catalyst is formed by mixing at least one tertiary amine with at least one polymer acid. Such catalysts are particularly useful in the polymerization of polyurethane foams.

The disclosure of the previously identified references is hereby incorporated by reference

BRIEF SUMMARY OF THE INVENTION

The industry needs amine catalysts that can effectively increase the rate of rise kinetics of low density full water-blown foam to avoid foam "creep" during spraying while at the same time maintain good physical properties, reduce odor, eliminate emissions and provide reactive systems that can minimize the exposure of workers and end users to the risk of glaucopsia. Foam "creep" is an expression used to describe a visual observation of a downward flow of polyurethane polymer caused by gravity when the polymerizing mass is not increasing its viscosity sufficiently fast due to low catalytic activity.

The objective of this invention is to provide a catalyst composition that is capable of providing a similar performance to the standard technology based on BDMAEE with the additional benefit of reduced emissions, odor and reduced amine exposure.

Another objective is to provide a catalyst composition that is able to provide fast reaction kinetics with the benefit of no post cure amine emissions even at temperatures as high as 120° C.

Yet another objective of this disclosure is to provide a polyurethane foam formula that produces polyurethane foams with low to no amine emission, but have similar physical and mechanical properties as those obtained with the current emissive amine catalyst standard BDMAEE.

In one exemplary embodiment, the current disclosure provides a catalyst composition for catalyzing the formation of polyurethane foam. The catalyst composition comprises at least one non-emissive catalyst and a tetraalkyl guanidine of the general formula:

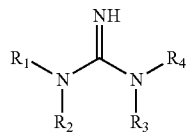

Wherein $R_1$, $R_2$, $R_3$ and $R_4$ are independently C1-C10 alkyl groups. The alkyl groups may be of any stereoisomer, either branched or un-branched.

In another exemplary embodiment, a catalyst composition for catalyzing the formation of polyurethane foam is provided. The catalyst composition consists essentially of at least one non-emissive catalyst and a tetraalkyl guanidine of the general formula:

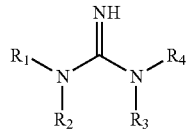

Wherein $R_1$, $R_2$, $R_3$ and $R_4$ are independently C1-C10 alkyl groups. The alkyl groups may be of any stereoisomer, either branched or un-branched.

In yet another exemplary embodiment, the disclosure provides a method for preparing a water blown, low density, rigid polyurethane foam. The method comprises contacting at least one polyisocyanate with at least one polyol, at an Isocyanate Index of 20 to 100, in the presence of an effective amount of a blowing agent composition comprising at least 75 wt % water and an effective amount of a catalyst composition according to the previous two embodiments. The rigid polyurethane foam has a density of 6 to 16 $Kg/m^3$. The method may be carried out through means well-known to the skilled person in the art, such as a one-shot process as described in Dow Polyurethane: Flexible Foams by Ron Herrington and Kathy Hock.

In yet another exemplary embodiment, a polyurethane foam formulation is disclosed. Such formulation comprises at least one polyol, at least an isocyanate, an effective amount of a blowing agent composition, and an effective amount of a catalyst composition as disclosed in either one of the first two embodiments.

The polyurethane foam formulation may further comprise other components, such as surfactants, emulsifiers, flame retardants, crosslinkers, cell stabilizers and any combination thereof.

The embodiments and various aspects of the invention can be used alone or in combination.

DETAILED DESCRIPTION OF THE INVENTION

The instant invention relates to compositions and methods to make low density and low or no-amine emissions foams using reactive catalyst. The method is useful in the preparation of about 6 $Kg/m^3$ to about 16 $kg/m^3$ density foam, particularly about 8 $kg/m^3$ density foam, using water as the main blowing agent. Water is able to react with isocyanates in the presence of tertiary amines to produce carbon dioxide that acts as blowing agent. This type of low density foam grade is conventionally made using strong blowing catalysts such as bis-(dimethylaminoethyl)-ether (BDMAEE, commercially available from Air Products and Chemicals as DABCO®BL19 or DABCO®BL11) or pentamethyl-diethylenetriamine (PMDETA, available from Air Products as POLYCAT®5). However, a high level of amine emissions occurs during and after foam application because large amount of catalyst is required for reacting water with isocyanate in the blowing process. These emissions are a safety hazard because workers exposed to volatile amines can develop a medical condition known as glaucopsia which is characterized by a temporary disturbance of vision. Workers' exposure can be particularly severe in residential spraying of confined spaces due to the lack of sufficient ventilation. Exposure to amines can also occur during blending of the amines with other components of the polyurethane formulation as well as during occupancy of the sprayed residence.

The instant invention is free or substantially free of amine emissions. That is, no amine catalyst emissions were detected when foam volatiles were extracted by passing a constant flow of inert gas through a sample of polyurethane foam that was conditioned at 32° C. and 60° C. Furthermore, foam emissions were evaluated using a more severe test method called VDA278 typically used in automotive applications in which foam samples are extracted at 90° C. and 120° C. Thermal desorption method VDA 278 is a standard polyurethane foam emission test procedure used in the automotive industry to evaluate emissions from polyurethane foam under aggressive conditions. In a dynamic headspace experiment, gas extraction is carried out continuously to remove all volatile components from the foam sample. The method consists essentially of two steps, where gaseous emissions that typically contribute to the contamination of the interior air quality are measured at 90° C. for 30 minutes (VOC) and subsequently at 120° C. for 60 minutes. In the first step, the foam sample is put into a thermal desorption tube that is continuously flushed with an inert gas for 30 minutes at 90° C. The volatile emissions being released from foam are collected in a cryogenic trap at −150° C. and at the end of the period the trapped residue is heated to 280° C. and injected into a GC-MS analyzer. Once the VOC's are measured, the second step consists of measuring the condensable emissions that are responsible for fogging in cars (FOG). The same sample is now heated up to 120° C. and gas is passed through the sample for 60 minutes, while the volatiles are condensed in a cryogenic trap at 150° C. The condensates are then heated up to 280° C. and analyzed by GC-MS.

The instant invention also relates to a result that acceleration of the front end of the rate of rise profile can happen when conventional gelling and/or blowing amine catalyst are combined with a tetralkylguanidine such as tetramethyguanidine at less or about 40 weight percent of the total amine content present in the high water formulation, or at less or about 30%, or at less or about 5% by weight of the total catalyst composition. This result is unexpected because tetramethyl guanidine is not structurally related to BDMAEE and, therefore, it is not expected to substantially activate the isocyanate/water reaction.

For the purpose of this disclosure, "non-emissive catalyst" is meant to be gelling and blowing amine catalysts having isocyanate reactive functionalities such as primary and secondary hydroxyl group (—OH), primary and secondary amine groups, urea and alkyl (substituted or unsubstituted) ureas and amides. Examples of catalysts comprise bis-(N,N-dimethylaminopropyl)-amine (commercially available from Air Products and Chemicals as POLYCAT® 15), N,N,N'-trimethylaminoethyl-ethanolamine (commercially available from Air Products and Chemicals as DABCO®T), POLYCAT-17 (N,N-dimethylaminopropyl-N'-methyl-N'-(2-hydroxyethyl)amine, dimethylethanolamine (commercially available as DABCO® DMEA), N,N-bis(3-dimethylamino-propyl)-N-(2-hydroxypropyl) amine, N,N-dimethyl-N',N'-bis(2-hydroxypropyl)-1,3-propylenediamine, 2-(2-dimethylaminoethoxy)ethanol, dimethylaminopropylurea and bis(dimethylaminopropyl)urea (commercially available as DABCO®NE1070 and DABCO®NE1080 from Air Products and Chemicals), 2-[N-(dimethylaminoethoxyethyl)-N-methylamino]ethanol, N,N,N'-trimethyl-N'-3-aminopropyl-bis(aminoethyl)ether, dimethylaminopropylamine (DMAPA); N-methyl-N-2-hydroxypropyl-piperazine, bis(dimethylamino)-2-propanol, N-(3-aminopropyl)imidazole, N-(2-hydroxypropyl)imidazol, 6-dimethylamino-1-hexanol and mixtures thereof. The amount of non-emissive catalyst typically ranges from about 10 pphp to about 50 pphp and in some cases, about 5 pphp to about 60 pphp The catalyst composition of the instant invention may comprise one or more non-emissive catalyst as defined above in combination with one or more tetraalkyl guanidine of the general formula:

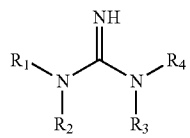

wherein R1, R2, R3 and R4 are independently C1-C10 alkyl groups. Unless otherwise specified, alkyl groups described herein are intended to include all structural isomers, linear or branched, of a given moiety within this definition. As an example, unless otherwise specified, the term propyl is meant to include n-propyl and iso-propyl, while the term butyl is meant to include n-butyl, iso-butyl, t-butyl, sec-butyl, and so forth. For instance, non-limiting examples of octyl isomers include 2-ethyl hexyl and neooctyl. An example of a suitable tetraalkyl guanidine is tetramethyl guanidine. The amount of tetraalkyl guanidine can range from about 0.5 pphp to about 20 pphp and normally about 1.0 pphp to about 10 pphp.

In an alternative embodiment, the catalyst composition of the instant invention may consist essentially of one or more non-emissive catalyst in combination with one or more tetraalkyl guanidine. By way of "consisting essentially of", the catalyst composition has less than about 10% by weight of emissive amine catalyst, metallic catalyst, other additives or impurities and typically about 5 wt. % or less of the foregoing emissive catalysts. Emissive amine catalyst comprises tertiary amine that does not have any isocyanate-reactive functionality. Examples of emissive amine catalyst comprise tertiary amines that are highly volatile and without isocyanate-reactive groups such as, diazabicyclooctane (triethylenediamine), supplied commercially as DABCO 33-LV® catalyst, tris(dimethylalminopropyl)amine (Polycat® 9), dimethylaminocyclohexylamine (Polycat® 8) and bis(dimethylaminopropyl)-N-methylamine (Polycat® 77). Suitable volatile blowing catalysts include, for example, bis-dimethylaminoethyl ether, commercially supplied as DABCO® BL-11 catalyst by Air Products and Chemicals, Inc.; as well as pentamethyldiethylenetriamine (POLYCAT® 5, Air Products and Chemicals, Inc.) and related compositions; higher permethylated polyamines; 2-[N-(dimethylaminoethoxyethyl)-N-methylamino]ethanol and related structures; alkoxylated polyamines; imidazole-boron compositions; or amino propyl-bis(amino-ethyl)ether compositions. Examples of metallic catalyst include tin(II) carboxylate salts, dialkyltin dicarboxylate salts such as dibutylin dilaureate, dimethyltin dilaureate, dimethyltin diacetate, dibutyltin diacetate, dimethyltin dilaurylmercaptide, dibutyltin dilaurylmercaptide, dimethyltin diisooctylmaleate, dibutyltin diisooctylmaleate, dimethyltin bi(2-thylhexyl mercaptacetate), dibutyltin bi(2-thylhexyl mercaptacetate), stannous octate, other suitable organotin catalysts, or a combination thereof. Other metals can also be included, such as, for example, bismuth (Bi). Suitable bismuth and tin (II) carboxylate salts includes salts of pentanoic acid, neopentanoic acid, hexanoic acid, 2-ethylhexyl carboxylic acid, neohexanoic acid, octanoic acid, neooctanoic acid, heptanoic acid, neoheptanoic acid, nonanoic acid, isononanoic acid, neononanoic acid, decanoic acid, neodecanoic acid, undecanoic acid, neoundecanoic acid, dodecanoic acid, neododecanoic acid, and other suitable carboxylic acids. Other salts of transition metals of lead (Pb), iron (Fe), zinc (Zn) with pentanoic acid, neopentanoic acid, hexanoic acid, 2-ethylhexyl carboxylic acid, octanoic acid, neooctanoic acid, neoheptanoic acid, neodecanoic acid, neoundecanoic acid, neododecanoic acid, and other suitable carboxylic acids may also be included.

Depending upon on the requirements during foam manufacturing or for the end-use application of the foam product, various additives can be employed in the PUR foam formulation to tailor specific properties. These include, but are not limited to, cell openers, cell stabilizers, emulsifiers, flame retardants, chain extenders, epoxy resins, acrylic resins, fillers, pigments, or any combination thereof. The total amount of the combined additives can range from about 50 pphp to about 250 pphp and typically about 90 pphp to about 200 pphp. It is understood that other mixtures or materials that are known in the art can be included in the foam formulations and are within the scope of the present invention.

The catalyst composition of this disclosure is suitable for polyurethane formulation containing water as the sole blowing agent. Alternatively, the catalyst composition may be used with a blowing agent composition comprising water and any blowing agent known in the art. Suitable blowing agents include compounds with low boiling points which are vaporized during the exothermic polymerization reaction. Such blowing agents are generally inert or they have low reactivity and therefore it is likely that they will not decompose or react during the polymerization reaction. Examples of inert blowing agents include, but are not limited to, carbon dioxide, chlorofluorocarbons (CFCs), hydrofluorocarbons (HFCs), hydrochlorofluorocarbons (HCFCs), fluoroolefins (FOs), chlorofluoroolefins (CFOs), hydrofluoroolefins (HFOs), hydrochlorfluoroolefins (HCFOs), acetone, and low-boiling hydrocarbons such as cyclopentane, isopentane, n-pentane, and their mixtures. Other suitable blowing agents include compounds, for example water, that react with isocyanate compounds to produce carbon dioxide. The amount of blowing agent can range from about 150 pphp to about 20 pphp and typically 100 pphp to about 40 pphp.

An exemplary embodiment of the catalyst composition comprises about 70% or more by weight of N,N,N'-trimethyl-N'-3-aminopropyl-bis(aminoethyl)ether and about 30% or less by weight of tetramethyl guanidine.

Polyurethane foams were prepared and tested in a conventional manner using the formulations shown below. The following formulation was used to test foams and study the rate of rise kinetics:

| Components | PPHP |
|---|---|
| Polyether Polyol | 100 |
| Emulsifier | 32 |
| Flame Retardant (TCPP) | 77 |
| Surfactant | 3.4 |
| Cell Opener | 0.15 |
| DABCO ®BL-11 (BDMAEE) | 10 |
| Water | 60 |

The PUR formulation comprising polyether polyol, water, cell stabilizers such as silicon surfactants, emulsifiers, flame retardants and optionally cell openers are combined with the catalyst composition of this disclosure.

Polyols suitable for use in such PUR formulations comprise active hydrogen-containing compounds for use with the foregoing polyisocyanates in forming the polyurethane foams of this invention can be any of those organic compounds having at least two hydroxyl groups such as, for example, polyols. Polyols that are typically used in PUR foam formation processes include polyalkylene ether and polyester polyols. The polyalkylene ether polyol includes the poly(alkyleneoxide) polymers such as poly(ethyleneoxide) and poly(propyleneoxide) polymers and copolymers with terminal hydroxyl groups derived from polyhydric compounds, including diols and triols, These include, but are not limited to, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, and sugars such as sucrose and like low molecular weight polyols.

Amine polyether polyols can be used in the present invention. These can be prepared when an amine such as, for example, ethylenediamine, diethylenetriamine, tolylenediamine, diphenylmethanediamine, or triethanolamine is reacted with ethylene oxide or propylene oxide.

In another aspect of the present invention, a single high molecular weight polyether polyol, or a mixture of high molecular weight polyether polyols, such as mixtures of different multifunctional materials and/or different molecular weight or different chemical composition materials can be used.

In yet another aspect of the present invention, polyester polyols can be used, including those produced when a dicarboxylic acid is reacted with an excess of a diol. Non-limiting examples include succinic, glutaric, pimelic, adipic, suberic, azelaic acid or phthalic acid or phthalic anhydride reacting with ethylene glycol or butanediol. Polyols useful in the present invention can be produced by reacting a lactone with an excess of a diol, for example, caprolactone reacted with propylene glycol. In a further aspect, active hydrogen-containing compounds such as polyester polyols and polyether polyols, and combinations thereof, are useful in the present invention.

Examples of emulsifiers that can be used in the instant invention can comprise—nonylphenol ethoxylates, anionic emulsifiers such as salts of fatty acids, salts of sulfuric acid esters, salts of phosphoric acid esters, salts of sulfonic acids, and combinations of any of these. Suitable cationic emulsifiers include, but are not limited to quaternary ammonium salts (pH dependent or permanently charged) such as cetyl trimethylammonium chloride, cetyl pyridinium chloride, polyethoxylated tallow amine, benzalkonium chloride, benzethonium chloride and the like. Suitable zwiterionic or amphoteric emulsifiers include but are not limited to sultaines, aminoacids, imino acids, betaines and phosphates. Suitable non-ionic emulsifiers include but are not limited to fatty alcohols, polyoxyethylene glycol alkyl ethers, polyoxypropylene glycol alkyl ethers, glucosides (such as decyl, lauryl and octyl glucosides), polyoxyethylene glycol alkyl phenol ethers, glycol alkyl esters, and the like. The amount of emulsifiers can range from about 2.0 pphp to about 50.0 pphp.

Examples of cell-openers that can be used in the instant invention can comprise cell openers as described in U.S. Pat. No. 5,614,566 as well as in U.S. Pat. Nos. 3,793,237, 3,920,587, 4,596,665, 4,794,127, 5,114,985, 5,244,931, 5,852,065, 6,043,290, and 6,046,249; the disclosure of which are hereby incorporated by reference. The amount of cell-openers can range from about 0.05 pphp to about 5.0 pphp.

Examples of surfactants that can be used in the instant invention can comprise silicone surfactants as well as organic anionic, cationic, zwiterionic or nonionic surfactants. Examples of suitable silicone surfactants include, but are not limited to, polyalkylsiloxanes, polyoxyalkylene polyol-modified dimethylpolysiloxanes, alkylene glycol-modified dimethylpolysiloxanes, or any combination thereof. Suitable anionic surfactants include, but are not limited to, salts of fatty acids, salts of sulfuric acid esters, salts of phosphoric acid esters, salts of sulfonic acids, and combinations of any of these. Suitable cationic surfactants include, but are not limited to quaternary ammonium salts (pH dependent or permanently charged) such as cetyl trimethylammonium chloride, cetyl pyridinium chloride, polyethoxylated tallow amine, benzalkonium chloride, benzethonium chloride and the like. Suitable zwiterionic or amphoteric surfactants include but are not limited to sultaines, aminoacids, imino acids, betaines and phosphates. Suitable non-ionic surfactants include but are not limited to fatty alcohols, polyoxyethylene glycol alkyl ethers, polyoxypropylene glycol alkyl ethers, glucosides (such as decyl, lauryl and octyl glucosides), polyoxyethylene glycol alkyl phenol ethers, glycol alkyl esters, and the like. The amount of surfactant can range from about 0.1 pphp to about 5 pphp.

In the various aspects of the invention, the blowing agent composition comprises at least about 75 wt % water, at least about 80 wt %, at least about 85 wt % water, at least about 90 wt % water or at least about 95 wt % water. In the desired embodiment of the various aspects of the invention, the blowing agent composition comprises about 100 wt % water.

Nevertheless, other blowing agents can be used in combination with the water in the PUR foam formation process and they include, but are not limited to, methylene chloride, acetone, chlorofluorocarbons (CFCs), hydrofluorocarbons (HFCs), hydrochlorofluorocarbons (HCFCs), hydrocarbons, fluoroolefins (FO), chlorofluoroolefins (CFO) and hydrochlorofluoroolefins (HCFO). Non-limiting examples of HFCs include HFC-245fa, HFC-134a, and HFC-365. Illustrative examples of HCFCs include HCFC-141b, HCFC-22, and HCFC-123. Exemplary hydrocarbons include n-pentane, isopentane, cyclopentane, and the like, or any combination thereof.

The amount of blowing agent composition used can vary based on, for example, the intended use and application of the foam product and the desired foam stiffness and density. In the foam formulation and method for preparing a rigid PUR foam of the present invention, the water-containing blowing agent composition is present in amounts from about 10 to about 80 parts by weight per hundred weight parts polyol (pphp), from about 12 to about 60 pphp, from about 14 to about 40 pphp, or from about 16 to about 25 pphp.

Depending upon on the requirements during foam manufacturing or for the end-use application of the foam product, various additives can be employed in the PUR foam formulation to tailor specific properties. These include, but are not limited to, cell stabilizers, flame retardants, chain extenders, epoxy resins, acrylic resins, fillers, pigments, or any combination thereof. The amount of these additives can range from about 50 pphp to about 250 pphp. It is understood that other mixtures or materials that are known in the art can be included in the foam formulations and are within the scope of the present invention.

The spray polyurethane foam is produced by contacting this mixture with isocyanate using a polyurethane foam spray gun that allows impingement mixing.

Examples of suitable polyisocyanates are hexamethylene diisocyanate, isophorone diisocyanate, phenylene diisocyanate, toluene diisocyanate ("TDI"), 4,4'-diphenyl methane diisocyanate ("MDI"). Especially suitable are 2,4- and 2,6-toluene diisocyanate individually or together as their commercially available mixtures. Other suitable mixtures of diisocyanates are those known commercially as "crude MDI" also known as PAPI, which contains about 60% of 4,4'-diphenylmethane diisocyanate along with other isomeric and analogous higher polyisocyanates. Also, suitable are pre-polymers of these polyisocyanates comprising a partially pre-reacted mixture of polyisocyanates and polyether and polyester polyol. The amount of polyisocyanate can range from about 1 pphp to about 100 pphp and typically about 5 pphp to about 50 pphp.

Suitable polyols are those polyols typically used in the art for making rigid PUR foam including the previously described polyalkylene ether and polyester polyols. Also, useful are amine polyether polyols which can be prepared when an amine, such as ethylenediamine, diethylenetriamine, tolylenediamine, diphenylmethanediamine, triethanolamine or the like is reacted with ethylene oxide or propylene oxide. Mannich polyols are also used in spray foam formulation to increase the reactivity of the system. Mannich polyols are typically prepared by condensation of phenol with formaldehyde in the presence of hydroxyl containing amines such as diethanolamine, ethanolamine and the like. In the practice of this invention, a single high molecular weight polyether polyol may also be used. Also, mixtures of high molecular weight polyether polyols such as mixtures of different multifunctional materials and/or different molecular weight or different chemical composition materials may be used. Useful polyester polyols include those produced when a dicarboxylic acid is reacted with an excess of a diol for example adipic acid or phathalic acid or phthalic anhydride with ethylene glycol or butanediol or reacting a lactone with an excess of a diol such as caprolactone with propylene glycol. In one aspect of the invention, a single high molecular weight polyether polyol may be used as the base polyol. Alternatively, a mixture of high molecular weight polyether polyols, for example, mixtures of di- and tri-functional materials and/or different molecular weight or different chemical composition materials may be used. Such di- and tri-functional materials include, but are not limited to polyethylene glycol, polypropylene glycol, glycerol-based polyether triols, trimethylolpropane-based polyether triols, and other similar compounds or mixtures. Polyurea modified polyols are formed by the reaction of a diamine and a diisocyanate in the presence of a starting polyol, with the product containing polyurea dispersion. A variant of polyurea modified polyols, also suitable for use, are polyisocyanate poly addition (PIPA) polyols, which are formed by the in situ reaction of an isocyanate and an alkanolamine in a polyol. Suitable polyether polyols also include those containing tertiary amine groups than can catalyze the gelling and the blowing reaction of polyurethanes, for example those described in WO 03/016373 A1, WO 01/58976 A1; WO2004/060956 A1; WO03/016372 A1; and WO03/055930 A1; the disclosure of the foregoing is hereby incorporated by reference. Other useful polyols may include polyalkylene carbonate-based polyols and polyphosphate-based polyols.

Other suitable polyols that can be used according to the invention include natural oil polyols or polyols obtained from renewable natural resources such as vegetable oils. Polyols useful in the preparation of polyurethane foam from inexpensive and renewable resources are highly desirable to minimize the depletion of fossil fuel and other non-sustainable resources. Natural oils consist of triglycerides of saturated and unsaturated fatty acids. One natural oil polyol is castor oil, a natural triglyceride of ricinoleic acid which is commonly used to make polyurethane foam even though it has certain limitations such as low hydroxyl content. Other natural oils need to be chemically modified to introduce sufficient hydroxyl content to make them useful in the production of polyurethane polymers. There are two chemically reactive sites that can be considered when attempting to modify natural oil or fat into a useful polyol: 1) the unsaturated sites (double bonds); and 2) the ester functionality. Unsaturated sites present in oil or fat can be hydroxylated via epoxidation followed by ring opening or hydroformilation followed by hydrogenation. Alternatively, transesterification can also be utilized to introduce OH groups in natural oil and fat. The chemical process for the preparation of natural polyols using epoxidation route involves a reaction mixture that requires epoxidized natural oil, a ring opening acid catalyst and a ring opener. Epoxidized natural oils include epoxidized plant-based oils (epoxidized vegetable oils) and epoxidized animal fats. The epoxidized natural oils may be fully or partially epoxidized and these oils include soybean oil, corn oil, sunflower oil, olive oil, canola oil, sesame oil, palm oil, rapeseed oil, tung oil, cotton seed oil, safflower oil, peanut oil, linseed oil and combinations thereof. Animal fats include fish, tallow and lard. These natural oils are triglycerides of fatty acids which may be saturated or unsaturated with various chain lengths from C12 to C24. These acids can be: 1) saturated: lauric, myristic, palmitic, steric, arachidic and lignoceric; 2) mono-unsaturated: palmitoleic, oleic, and 3) poly-unsaturated: linoleic, linolenic, arachidonic. Partially or fully epoxidized natural oil may be prepared when reacting peroxyacid under suitable reaction conditions. Examples of peroxyacids utilized in the epoxidation of oils have been described in WO 2006/116456 A1; hereby incorporated by reference. Ring opening of the epoxidized oils with alcohols, water and other compounds having one or multiple nucleophilic groups can be used. Depending on the reaction conditions oligomerization of the epoxidized oil can also occur. Ring opening yields natural oil polyol that can be used for the manufacture of polyurethane products. In the hydroformilation/hydrogenation process, the oil is hydroformylated in a reactor filled with a hydrogen/carbon monoxide mixture in the presence of a suitable catalyst (typically cobalt or rhodium) to form an aldehyde which is hydrogenated in the presence of cobalt or nickel catalyst to form a polyol. Alternatively, polyol from natural oils and fats can be produced by trans-esterification with a suitable poly-hydroxyl containing substance using an alkali metal or alkali earth metal base or salt as a trans-esterification catalyst. Any natural oil or alternatively any partially hydrogenated oil can be used in the transesterification process. Examples of oils include but are not limited to soybean, corn, cottonseed, peanut, castor, sunflower, canola, rapeseed, safflower, fish, seal, palm, tung, olive oil or any blend. Any multifunctional hydroxyl compound can also be used such as lactose, maltose, raffinose, sucrose, sorbitol, xylitol, erythritol, mannitol, or any combination. The amount of polyol can range from about 1 pphp (an additive polyol) to about 100 pphp (a single polyol used) and typically about 5 pphp (an additive polyol) to about 100 pphp (a single polyol).

The catalyst composition and the method for preparing polyurethane foam of the present invention are useful in the formation of low density, rigid polyurethane foams. Such foams are generally produced with an Isocyanate Index, or NCO Index within a range of about 20 to about 100, or about 20 to about 50. NCO index is the actual amount of polyisocyanate used divided by the theoretically required stoichiometric amount of polyisocyanate required to react with all the active hydrogen in the reaction mixture, multiplied by 100. For purposes of the present disclosure, Isocyanate Index is represented by the equation: Isocyanate Index=(Eq NCO/Eq of active hydrogen)×100, wherein Eq NCO is the number of NCO functional groups in the polyisocyanate, and Eq of active hydrogen is the number of equivalent active hydrogen atoms.

Other typical components found in the polyurethane formulation include cell stabilizers surfactants such as organopolysiloxanes, emulsifying agents, cell openers, flame retardants such as halogenated organophosphorous compounds and chain extenders such as ethylene glycol and butane diol. The amount of such components can range from about 50 pphp to about 150 pphp and typically about 70 pphp to about 120 pphp.

The term "contacting" is used herein to describe means to bring components into contact with each other in any order, in any manner, and for any length of time. For example, the components can be contacted by blending or mixing. Further, contacting of any component can occur in the presence or absence of any other component of the compositions or formulations described herein. Still further, two or more of the components of the formulation described herein may react to form other components in composing the composition. Combining additional materials or components can be done by any method known to one of skill in the art.

Example 1

Rate of Rise of Foam Prepared with Standard Emissive Amine Catalyst Blend (BDMAEE and DMAEE)

The following formulation was used to make foam using the industry standard catalysts combination bis-(dimethylaminoethyl)-ether (BDMAEE) and dimethylaminoethoxy ethanol (DMAEE).

| Components | Parts |
|---|---|
| Polyether Polyol | 30.94 |
| Emulsifier (Nonylphenol ethoxylated) | 9.88 |

-continued

| Components | Parts |
|---|---|
| Flame Retardant (TCPP) (Tris(2-trichloroisopropyl)phosphate | 23.74 |
| Surfactant (Silicon surfactant) | 1.05 |
| Cell Opener (Polybutadiene and/or polyoctenylene cell opener) | 0.05 |
| Standard 1: DABCO ®BL-11 Bis(dimethylaminoethyl)ether | 5.28 |
| Co-catalyst: DMAEE (Dimethylaminoethoxyethanol) | 2.24 |
| Water | 18.05 |
| MDI | 91.23 |

The above components were mixed and allowed cooling to about 5° C. before mixing with the corresponding amount of isocyanates. Approximately 25 g of the above premix were mixed with 25 g of isocyanate (MDI) in a mechanical agitator in a two litter plastic container. Start time, rate of rise, foam height, speed of foam formation were measured using a FOMAT sonar detector (Ultrasonic Fan Sensor LR 2-40 PFT) place right above the mixing container and measure for several minutes. The diagram and table below provides the foam kinetic data for the standard. The Sonar detector monitors the foaming process and automatically records the Choice Time (sec), which is the time that the foam reaches 80% of the maximum height; the Rise Time (sec), which is the time that the foam reaches 98% of the maximum height; the Maximum Height (mm), which is the highest point in the rate of rise profile; the Final Height (mm), which is the final height reached at the end of each measurement.

| Parameter | Value |
|---|---|
| Choice Time (80% H, seconds) | 5.8 |
| Rise Time (98% H, seconds) | 6.7 |
| Maximum Height (mm) | 231 |
| Final Height (mm) | 226 |

Example 2

Foam Rate of Rise of Comparison Between BMDAEE/DMAEE Control and TMG (Tetramethylguanidine [TMG])

Foams were prepared in a similar manner as the previous example. Tetramethylguanidine was used at two different use levels as shown in the table below.

| Components | #2 | #3 |
|---|---|---|
| Polyether Polyol | 30.94 | 30.94 |
| Emulsifier (same as above) | 9.88 | 9.88 |
| Flame Retardant (TCPP) (same as above) | 23.74 | 23.74 |
| Surfactant (same as above) | 1.05 | 1.05 |
| Cell Opener (same as above) | 0.05 | 0.05 |
| TMG (Tetramethylguanidine) | 2.50 | 8.00 |
| Water | 18.05 | 18.05 |
| MDI | 91.23 | 91.23 |

Data below shows that the kinetic of rate of rise for foam #2 is much lower than the control standard. Increasing the level of TMG as in foam #3 gave a much faster kinetic than #2 and more comparable to the industry standard. However, increasing the level of TMG had a deep negative impact on foam height. Furthermore, the physical properties of foam made with TMG are very poor and foam degradation was immediately seen after foam curing. The complete lack of mechanical integrity of foam made with TMG prevented its use in any practical application.

| Parameter | Control (#1) | #2 | #3 |
|---|---|---|---|
| Choice Time (80% H, seconds) | 5.8 | 20 | 4.4 |
| Rise Time (98% H, seconds) | 6.7 | 22 | 5.2 |
| Maximum Height (mm) | 231 | 175 | 175 |
| Final Height (mm) | 226 | 157 | 166 |

Example 3

Foam Rate of Rise Comparison Between BMDAEE/DMAEE Control and Non-Emissive Catalyst Combination "A" Polycat®-15/Dabco®-T This example shows a comparison between the standard catalyst composed of a mixture of BMDAEE/DMAEE and catalyst combination "A" of non-emissive catalysts that includes 85% bis(dimethylaminopropyl)amine (commercially available as Polycat®-15) and 15% N-(dimethylaminoethyl)-N-(2-hydroxyethyl)-N-methylamine (commercially available as Dabco®T). It is clear from the graph below that the standard is significantly more active that the non-emissive catalyst combination. While the BDMAEE/DMAEE standard is used at 7.52 parts the non-emissive catalyst combination requires a much higher use level and even at 8.5 parts some small front end delay is still observed as evidenced by choice time and rise time. The low catalytic activity is due to a combination of factors including catalyst immobilization and ineffective water activation as compared with BDMAEE.

| Parameter | Control | "A" #4 |
|---|---|---|
| Choice Time (80% H, seconds) | 5.8 | 6.7 |
| Rise Time (98% H, seconds) | 6.7 | 7.9 |
| Maximum Height (mm) | 231 | 222 |
| Final Height (mm) | 226 | 219 |

Example 4

Foam Rate of Rise Comparison Between BMDAEE/DMAEE Control and Non-Emissive Catalyst Combination "B" Made with 2-[N-(dimethylaminoethoxyethyl)ethanol and DMAEE In this example, 10.4 parts of a catalyst combination "B" having the following components: a) 2-[N-(dimethylaminoethoxyethyl)-N-methylamino]ethanol (78%) and b) DMAEE (22%) was used to make polyurethane foam and its rate of rise kinetic compared with the control standard BDMAEE/DMAEE catalyst system. The tables below show the formulation using catalyst combination "B" as well as the foam kinetic data.

The purpose of this example is to illustrate that most efficient blowing catalysts having the N—C2-O—C2-N backbone ideal for promoting the blowing reaction, such as 2-[N-(dimethylaminoethoxyethyl)-N-methylamino]ethanol, are not able to provide the fast front end kinetics of the control even when using large excess of catalyst. Using large excess of catalyst increased front end kinetics to some extend but it did not match the control. Also, excess of catalyst produced fast kinetics but at the expense of excessive blowing toward the end of the reaction which caused a decrease in foam density which negatively impacted the mechanical properties. Thus, using large excess of non-emissive and most efficient blowing catalyst know in the art did not provide a solution to the problem of having a rate of rise kinetics comparable to the control and suitable foam properties.

| Components | #5 |
|---|---|
| Polyether Polyol | 30.94 |
| Emulsifier (same as above) | 9.88 |
| Flame Retardant (TCPP) | 23.74 |
| Surfactant (same as above) | 1.05 |
| Cell Opener (same as above) | 0.05 |
| 2-[N-(dimethylaminoethoxyethyl)-N-methylamino] ethanol | 8.16 |
| DMAEE (Dimethylaminoethoxyethanol) | 2.24 |
| Water | 18.05 |
| MDI | 94.11 |

| Parameter | Control | "B" #5 |
|---|---|---|
| Choice Time (80% H, seconds) | 5.8 | 7.2 |
| Rise Time (98% H, seconds) | 6.7 | 8.5 |
| Maximum Height (mm) | 231 | 267 |
| Final Height (mm) | 226 | 263 |

Example 5

Foam Rate of Rise Comparison of Catalyst Combination "a" Polycat®-15/Dabco®-T with and without TMG In this example catalyst combination "A" was used at 9.0 parts and compared with another combination that contain 8.5 parts of "A" together with 0.5 parts TMG. The formulations and kinetic data are shown below.

| Components | #6 | #7 |
|---|---|---|
| Polyether Polyol | 30.94 | 30.94 |
| Emulsifier (same as above) | 9.88 | 9.88 |
| Flame Retardant (TCPP) | 23.74 | 23.74 |
| Surfactant (same as above) | 1.05 | 1.05 |
| Cell Opener (same as above) | 0.05 | 0.05 |
| TMG (Tetramethyguanidine) | 0.00 | 0.50 |
| Catalyst "A" | 9.00 | 8.50 |
| Water | 18.05 | 18.05 |
| MDI | 91.23 | 91.23 |

| Parameter | Control (#1) | #6 | #7 |
|---|---|---|---|
| Choice Time (80% H, seconds) | 5.8 | 6.1 | 5.5 |
| Rise Time (98% H, seconds) | 6.7 | 7.2 | 6.7 |

-continued

| Parameter | Control (#1) | #6 | #7 |
|---|---|---|---|
| Maximum Height (mm) | 231 | 216 | 204 |
| Final Height (mm) | 226 | 211 | 201 |

In both cases 6 and 7 the same total amount of catalyst was used (9.0 parts) but in #6 all 9.0 parts are catalyst "A" while in #7 a smaller amount of "A" was used (8.5 parts) and the remaining 0.5 parts were completed by the addition of TMG to give also 9.0 parts of total catalyst added. The result clearly indicates that the catalyst system containing a small amount of TMG (5.5% of the total catalyst blend) was faster than "A".

Example 6

Foam Rate of Rise Comparison Between BMDAEE/DMAEE Control, Non-Emissive Catalyst Combination Polycat®-15/Dabco®-T and Non-Emissive Catalyst Combination "C" Containing TMG (Tetramethylguanidine)

In this example, 8.5 parts of a catalyst combination "C" having the following components: a) bis-(dimethylaminopropyl)amine (82.5%; Polycat®-15); b) 2-[N-(dimethylaminoethoxyethyl)-N-methylamino]ethanol (12.5%); c) Tetramethylguanidine (5.0%) were compared with the standard BDMAEE/DMAEE described in example 1 (foam #1) and with the non-emissive catalyst combination described in example 3 (foam #4). The formulation for foam #8 is shown in the following table:

| Components | #8 |
|---|---|
| Polyether Polyol | 30.94 |
| Emulsifier (same as above) | 9.88 |
| Flame Retardant (TCPP) | 23.74 |
| Surfactant (same as above) | 1.05 |
| Cell Opener (same as above) | 0.05 |
| (Bis(dimethylaminopropyl)amine) (Polycat ®-15) | 7.01 |
| 2-[N-(dimethylaminoethoxyethyl)-N-methylamino] ethanol | 1.06 |
| TMG | 0.42 |
| Water | 18.05 |
| MDI | 91.23 |

Catalyst combination "C" provides rate of rise profile that not only replicates the choice time and rise time of the control but also the maximum height and final height. It is very surprising that when adding a small amount of TMG (5.0% of total catalyst loading) a substantial increase in the reaction rate occur so that the kinetic of the control could be reproduced. Such result was not possible in the absence of TMG as already demonstrated in the previous examples.

| Parameter | Control #1 | #4 | Catalyst "C" #8 |
|---|---|---|---|
| Choice Time (mm, 80% H, seconds) | 5.8 | 6.7 | 5.7 |
| Rise Time (seconds, 98% H) | 6.7 | 7.9 | 6.8 |
| Maximum Height (mm) | 231 | 222 | 239 |
| Final Height (mm) | 226 | 219 | 234 |

Example 7

Foam Rate of Rise Comparison Between BMDAEE/DMAEE Control, Non-Emissive Catalyst Combination Polycat®-15/Dabco®-T and Non-Emissive Catalyst Combination "D" Containing TMG (Tetramethylguanidine)

In this example, 8.5 parts of a catalyst combination "D" having the following components: a) bis-(dimethylaminopropyl)amine (82.5%; Polycat®-15); b) N,N,N'-trimethyl-N'-3-aminopropyl-bis(aminoethyl)ether (12.5%; Dabco®NE300); c) Tetramethylguanidine (5.0%) were compared with the standard BDMAEE/DMAEE described in example 1 (foam #1) and with the non-emissive catalyst combination described in example 3 (foam #4). The formulation for foam #9 is shown in the following table:

| Components | #9 | #10 |
|---|---|---|
| Polyether Polyol | 30.94 | 30.94 |
| Emulsifier (same as above) | 9.88 | 9.88 |
| Flame Retardant (TCPP) | 23.74 | 23.74 |
| Surfactant (same as above) | 1.05 | 1.05 |
| Cell Opener (same as above) | 0.05 | 0.05 |
| (Polycat ®-15) | 7.01 | 7.01 |
| N,N,N'-trimethyl-N'-3-aminopropyl-bis(aminoethyl) ether | 1.06 | 0.53 |
| 2-[N-(dimethylaminoethoxyethyl)-N-methylamino] ethanol (Dabco ®T) | 0.00 | 0.53 |
| TMG | 0.42 | 0.42 |
| Water | 18.05 | 18.05 |
| MDI | 91.23 | 91.23 |

Catalyst combination "D" provides rate of rise profile that not only replicates the choice time and rise time of the control but also the maximum height and final height. As shown in previous examples, adding a small amount of TMG (5.0% of total catalyst loading) increased the reaction rate of so that the rate of rise kinetic matched the standard. Such result was not possible in the absence of TMG as already demonstrated in the previous examples. Catalyst combination "D" is analogous to "C" but in "D" the blowing catalyst N,N,N'-trimethyl-N'-3-aminopropyl-bis(aminoethyl)ether having a primary amine group was used. This catalyst is structurally related to BDMAEE because it also has the N—C2-O—C2-N backbone needed for water activation. Thus both combinations "C" and "D" having 5.0% of TMG (based on total catalyst loading) are very effective and most comparable to the emissive standard control. A similar case was also found for catalyst combination "E" which also contains 5.0% TMG.

| Parameter | Control #1 | #4 | Catalyst "C" #8 | Catalyst "D" #9 | Catalyst "E" #10 |
|---|---|---|---|---|---|
| Choice Time (mm, 80% H, seconds) | 5.8 | 6.7 | 5.7 | 5.4 | 5.4 |
| Rise Time (seconds, 98% H, seconds) | 6.7 | 7.9 | 6.8 | 6.4 | 6.4 |
| Maximum Height (mm) | 231 | 222 | 239 | 227 | 224 |
| Final Height (mm) | 226 | 219 | 234 | 222 | 220 |

The invention claimed is:
1. A blowing catalyst composition for making a spray polyurethane foam consisting essentially of:

at least one non-emissive catalyst and at least one tetraalkyl guanidine of the following formula:

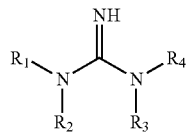

wherein $R_1$, $R_2$, R3 and $R_4$ are independently selected from C1-C10 alkyl groups and branched or un-branched isomers thereof, wherein the at least one tetraalkyl guanidine is present in an amount of about 5 wt. % or less of the blowing catalyst composition, wherein the amount of the at least one tetraalkyl guanidine is sufficient to increase the rate of rise kinetics of the spray polyurethane foam, wherein the blowing catalyst composition catalyzes an isocyanate/water reaction to produce carbon dioxide sufficient for making the spray polyurethane foam, and wherein the at least one non-emissive catalyst comprises N,N,N'-trimethylaminoethyl-ethanolamine.

2. The blowing catalyst composition of claim 1, further comprising a blowing agent composition comprising water.

3. The blowing catalyst composition of claim 1, wherein the at least one tetraalkyl guanidine comprises tetramethyl guanidine.

4. The blowing catalyst composition of claim 1, wherein the amount of the at least one tetraalkyl guanidine in the blowing catalyst composition is sufficient to achieve a Choice Time as measured by a sonar detector of 5.8 seconds or shorter.

5. The blowing catalyst composition of claim 1, further comprising at least one member selected from the group consisting of 6-dimethylamino-1-hexanol, (N,N-dimethyl-aminopropyl-N'-methyl-N'-(2-hydroxyethyl)amine, dimethylethanolamine, N,N-bis(3-dimethylamino-propyl)-N-(2-hydroxypropyl) amine, dimethylaminopropylurea, N,N, N'-trimethyl-N'-3-aminopropyl-bis(aminoethyl)ether, N,N, N'-trimethyl-N'-2-hydroxyethyl-bis(aminoethyl)ether, dimethylaminopropylamine, N-methyl-N-2-hydroxypropyl-piperazine, and any combination thereof.

6. The blowing catalyst composition of claim 1, wherein the at least one non-emissive catalyst further comprises a non-emissive catalyst selected from the group consisting of (N,N-dimethylaminopropyl-N'-methyl-N'-(2-hydroxyethyl) amine, N,N-bis(3-dimethylamino-propyl)-N-(2-hydroxypropyl)amine, dimethylaminopropylurea, N,N,N'-trimethyl-N'-3-aminopropyl-bis(aminoethyl)ether, dimethylaminopropylamine, N-methyl-N-2-hydroxypropyl-piperazine, 6-dimethylamino-1-hexanol, and combinations thereof.

7. A blowing catalyst composition for catalyzing the formation of a polyurethane foam comprising:
about 95% or more by weight of a non-emissive blowing catalyst comprising: N,N,N'-trimethyl-N'-3-aminopropyl-bis(aminoethyl)ether and at least one additional non-emissive catalyst; and
the presence of tetramethyl guanidine in an amount of about 5% or less, by weight.

8. A method for preparing a spray polyurethane foam, comprising:
contacting at least one polyisocyanate with at least one polyol in the presence of a blowing agent consisting essentially of water, at least one gelling catalyst, and the blowing catalyst composition according to claim 1; and
spraying, thereby producing the rigid polyurethane foam, wherein the polyurethane foam has a density of about 6 to about 16 $Kg/m^3$ and substantially no amine emissions when measured in accordance with VDA 278.

9. The method of claim 8, further including contacting the at least one polyisocyanate with the at least one polyol at an Isocyanate Index of 20 to 50.

10. The method of claim 8, wherein the at least one tetraalkyl guanidine comprises tetramethyl guanidine.

11. A polyurethane foam formulation, comprising:
at least one polyol;
at least one isocyanate;
a blowing agent consisting essentially of water;
a blowing catalyst composition according to claim 1; and
a gelling catalyst.

12. The polyurethane foam formulation of claim 11, further comprising at least one member selected from a group consisting of a surfactant, an emulsifier, a flame retardant, a crosslinker, a cell stabilizer, and combinations thereof.

13. The polyurethane foam formulation of claim 12, wherein the at least one tetraalkyl guanidine comprises tetramethyl guanidine.

14. The polyurethane foam formulation of claim 11, wherein the formulation is effective to produce a foam having a density of about 6 to about 16 $Kg/m^3$.

15. The polyurethane foam formulation of claim 14, wherein the formulation is effective to produce a foam having a density of about 8 $Kg/m^3$.

16. A catalyst composition consisting essentially of:
at least one blowing catalyst comprising N,N,N'-trimethylaminoethyl-ethanolamine;
at least one gelling catalyst comprising bis-(N,N-dimethylaminopropyl)-amine; and
at least one tetraalkyl guanidine of the following formula:

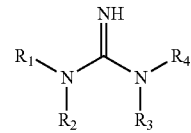

wherein $R_1$, $R_2$, R3 and $R_4$ are independently selected from C1-C10 alkyl groups and branched or un-branched isomers thereof, wherein the at least one tetraalkyl guanidine is present in an amount of about 5 wt. % or less of the composition, wherein the amount of the at least one tetraalkyl guanidine is sufficient to increase the rate of rise kinetics of the spray polyurethane foam, wherein the catalyst composition is sufficient to catalyze an isocyanate/water reaction to produce carbon dioxide, and wherein a polyurethane foam obtained from the catalyst composition has substantially no amine catalyst emissions.

17. The catalyst composition of claim 16, wherein a foam produced from the catalyst composition is free of amine emissions in accordance with VDA 278.

18. The method of claim 8, wherein the at least one gelling catalyst has at least one isocyanate reactive functionality.

19. The method of claim 18, wherein the at least one gelling catalyst comprises bis-(N,N-dimethylaminopropyl)-amine.

20. The method of claim 8, wherein the spraying comprises impingement mixing using a spray gun.

21. The blowing catalyst composition of claim 7, wherein the at least one additional non-emissive catalyst is selected from the group consisting of N,N,N'-trimethylaminoethyl-ethanolamine, (N,N-dimethylaminopropyl-N'-methyl-N'-(2-hydroxyethyl)amine, dimethylethanolamine, N,N-bis(3-dimethylamino-propyl)-N-(2-hydroxypropyl)amine, dimethylaminopropylurea, N,N,N'-trimethyl-N'-3-amino-propyl-bis(aminoethyl)ether, dimethylaminopropylamine, N-methyl-N-2-hydroxypropyl-piperazine, 6-dimethyl-amino-1-hexanol, and combinations thereof.

\* \* \* \* \*